(No Model.) 2 Sheets—Sheet 1.
J. O. & H. H. BENDER.
TRANSPLANTER.
No. 490,942. Patented Jan. 31, 1893.
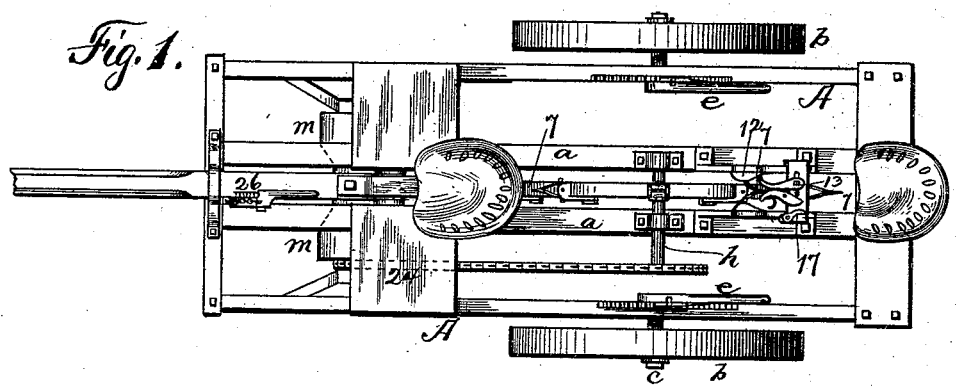
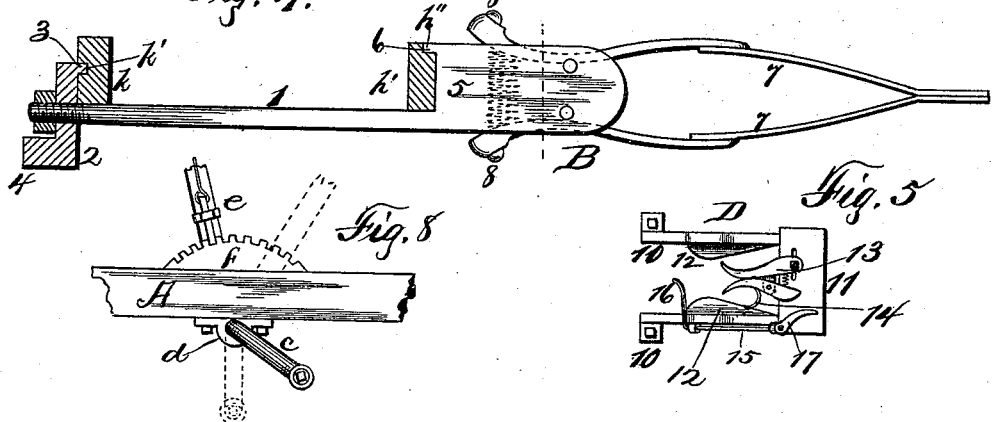
WITNESSES:
A. P. Fowler
C. B. Kinne
INVENTORS
John O. Bender
Hubert H. Bender
BY
Smith & Denison
their ATTORNEYS (No Model.) 2 Sheets—Sheet 2.
J. O. & H. H. BENDER.
TRANSPLANTER.
No. 490,942. Patented Jan. 31, 1893.
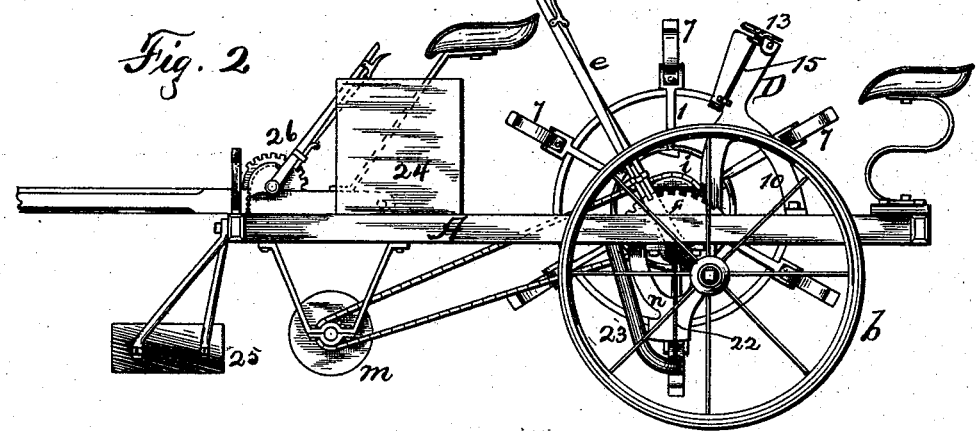
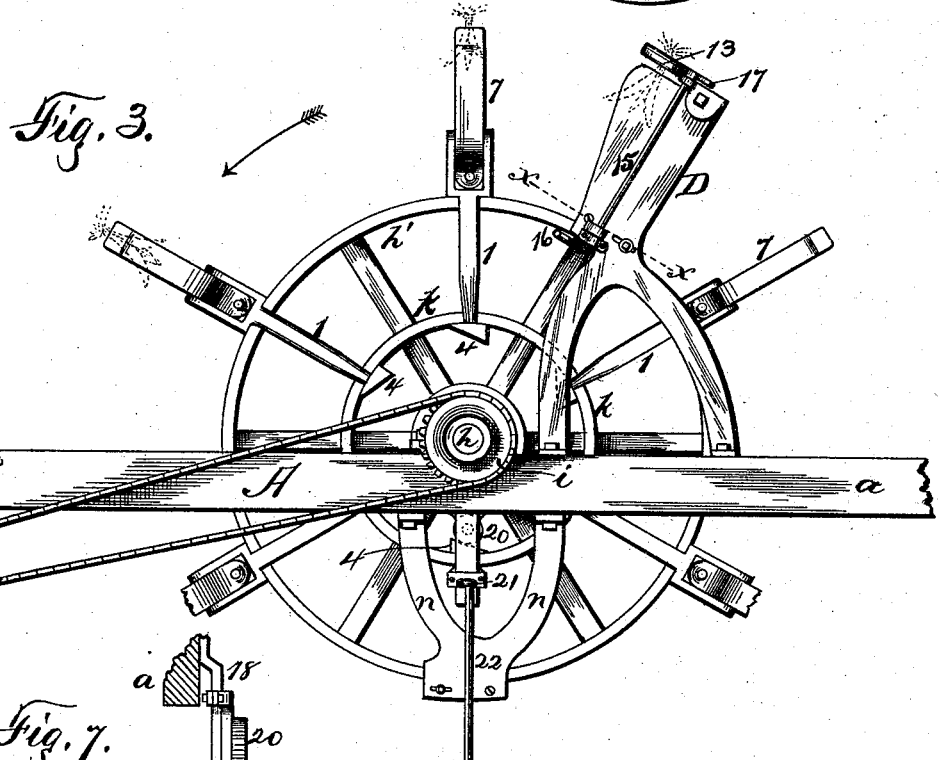
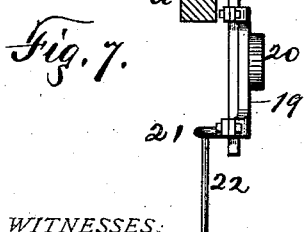
WITNESSES:
A. P. Fowler
C. B. Kime
INVENTORS,
John Bender
Hubert H. Bender
BY
Smith & Denison
their ATTORNEYS

UNITED STATES PATENT OFFICE.

JOHN O. BENDER AND HUBERT H. BENDER, OF FAYETTEVILLE, NEW YORK.

TRANSPLANTER.

SPECIFICATION forming part of Letters Patent No. 490,942, dated January 31, 1893.

Application filed December 1, 1891. Serial No. 413,702. (No model.)

*To all whom it may concern:*

Be it known that we, JOHN O. BENDER and HUBERT H. BENDER, of Fayetteville, in the county of Onondaga, in the State of New York, have invented new and useful Improvements in Transplanters, of which the following, taken in connection with the accompanying drawings, is a full, clear, and exact description.

Our invention relates to apparatus for setting out plants of different kinds, in fact of all kinds, adapted to be transplanted and set in rows at a given distance apart.

Our object is to produce a transplanter in which the plants are successively placed by hand in a spring jaw clamp, from which they are successively and automatically taken by the droppers, which are mounted in or upon a wheel and project beyond its rim, which droppers are properly opened to drop the plants when their points are in the earth; means being provided to automatically open said droppers first to receive a plant and then to release it; means being also provided to vary the distance between the droppers and thus vary the space between the plants when set; means being further provided to automatically water each plant at substantially the time when it is set by the dropper; and means being provided to vary the depth of the setting of the plants, and to support the droppers wholly out of contact with the earth.

Our invention consists in the several novel features of construction and operation hereinafter described and which are specifically set forth in the claims hereunto annexed. It is constructed as follows, reference being had to the accompanying drawings, in which Figure 1, is a top plan of the apparatus, complete. Fig. 2, is a side elevation thereof. Fig. 3, is an enlarged side elevation of the dropper wheel, droppers and plant clamp. Fig. 4, is a front elevation of a dropper and part of the wheel in section. Fig. 5, is a top plan of the clamp, the supporting frame, the dropper openers therein and the trip which opens the clamp. Fig. 6, is a transverse section of the clamp supporting frame, on line *x x* in Fig. 3, showing the wedges for opening the droppers, and a dropper just about to enter to be opened. Fig. 7, is a sectional detail showing in elevation, the mechanism operated by the lugs on the dropper shafts to intermittently operate the water valve, to water each plant. Fig. 8, is a detail of the mechanism by which we vary the depth of the setting of the plants, or, when desired, raise the droppers out of contact with the earth.

"A," is the main frame, of rectangular form and provided with the parallel longitudinal timbers —*a*—*a*—, the whole being rearwardly supported by the wheels —*b*—*b* each of which is mounted upon a short crank axle —*c*—, journaled in a bearing —*d*—, under the side frame timber on each side of the frame; and —*e*— is a ratchet lever secured to the inner end of each axle and provided with a dog which engages with the quadrant rack —*f*— and holds the axle in whatever position it is rotated, by said lever, and the frame is raised or lowered, as to its rear end, by thus operating said lever, as is indicated by the dotted lines in Fig. 8. These levers are operated independently of each other.

Upon the frame bars —*a*—, we journal a shaft —*h*— upon which we secure the dropper wheel consisting of a hub, spokes, outer rim —*h'*— and a ring —*k*— between the rim and hub and secured to the spokes. Upon the end of this shaft we secure a sprocket wheel, and —*i*— is a sprocket belt, leading around a like wheel upon the shaft which carries the ridging roll —*m*— under the front of the frame; but we can drive the dropper wheel in other ways.

As shown in Fig. 4, the rim —*h'*— is rabbeted exteriorly as at —*h''*—; and the ring —*k*— is provided exteriorly with a groove —*k'*— in its outer face.

B—B is a plant dropper comprising a threaded shank a block —2— fitting thereon and provided with a flange —3— fitting in the groove —*k'*—, and with a wedging face —4—; a head consisting of two parallel bars —5—, each provided upon its inner end with a lug —6—, which fits into the rabbet —*h''*—; gripping jaws —7— of substantially the form shown, pivotally mounted between the bars —5—, and each provided with an outwardly projecting arm —8—, and said jaws are normally held closed by a spring —9— between the arms —8—. The outer ends of the jaw plates are made so that they fit closely together as shown. Each dropper is secured at any desired position upon the rim by tightening the nut upon the shank, and by loosening the nuts we can shift the droppers so as to adjust and set them at any desired distance apart ranging from a few inches to several feet, according to the kind of plant to be set. This adjustability of the droppers is a very important feature of our invention, and greatly increases the utility of the machine and its range of work.

Upon the frame bars —a— we mount the auxiliary frame —D— comprising the parallel legs —10—, connected at the top by a cross bar —11—; the cams —12— secured upon the inner faces of the legs and opposite to each other. This frame stands astride of the dropper wheel and the droppers pass through it, when the wheel is rotated.

Upon cross bars —11— we pivot the plant holder —13— comprising a pair of jaws normally closed by a spring, one of said jaws being provided with a finger —14— (Fig. 5), by which the operator can open one jaw piece while inserting a plant, which is held in this holder, as shown in Fig. 3, with the roots outermost, until it is taken therefrom by the dropper.

Upon the side of one of the legs of the frame —D— in suitable eyes, we mount a trip-rod —15—, provided with an arm —16—, upon its inner end, projecting into the space between the two legs of said frame, and upon its outer end with a cam —17— adapted to engage with the rear end of one of the jaw pieces of the plant holder, and open it, when a plant dropper engages with the arm —16—. A spring (not shown) of ordinary construction can be provided upon the rod —15—, to return it to its normal position when released from its engagement with a passing dropper.

The operator sits upon the rear seat and inserts the plants into the plant holder successively, and then, as the wheel rotates, when a dropper enters the space within the frame —D—, the arms upon the plant holder engage with the cams —12— and are forced toward each other, thus opening the outer end thereof, so that the top of the plant enters between them. Just at this time, which is just as said arms are leaving, or about to leave the cams, the dropper strikes the trip arm —16—, and swings the cam —17— into engagement with the plant holder, and opens it releasing the plant therefrom. At the same instant of this release, the gripping jaws are released from the cams and close upon the top of the plant, and pick it out from the plant holder.

Beneath the main frame, we secure a downwardly extending opener consisting of two legs, —n—, parallel to each other, and provided upon their lower interior faces with cams, like those which open the dropper to receive the plant, which spread open the ends of the plant holding plates; while they are in the earth, creating an opening therein wide enough to receive the roots, leave the plant therein in an upright position, and the dirt will roll back upon the roots.

Upon one of the frame bars —a—, we secure a bracket arm —18— (Fig. 7). Upon this we mount a slide —19—, provided with a roller —20— upon its inner face, and said slide is provided with an outwardly projecting arm —21—, to which a rod —22— is connected, the lower end of which is connected to the vertically moving gate of a gate valve, (not shown, but of ordinary construction) which valve is secured upon the end of the hose —23—, which is connected to the water tank —24—; and then as the dropper wheel rotates, the wedges —4— are successively brought into contact with the roller, (as shown in Fig. 3) and each operates to raise the roller and slide a valve gate and deposit a modicum of water upon the plant as the dropper leaves it.

Upon the front end of the main frame, we mount the clearing plow —25—, which is adjustable vertically, in the ordinary manner, by means of the ratchet lever and quadrant mechanism —26—.

What we claim as our invention and desire to secure by Letters Patent, is

1. The combination with the dropper wheel, provided with a rim and a ring inside of it, secured upon its spokes, of plant droppers secured and adjustable upon said rim and ring.

2. In a transplanter, a dropper comprising two plates pivotally connected having their outer ends normally adapted to hold the stem of the plant, and thence diverging toward the pivot, creating a chamber to receive the top of the plant, and having their inner ends diverging and a spring between them, and means to mount it adjustably in the rim of a rotating dropper wheel, and projecting beyond the same, in combination with the wheel.

3. The combination with the main frame, the dropper wheel journaled thereon, and provided with a rim, and an inner concentric ring secured upon the spokes, and droppers consisting of a shank detachably secured to said ring, a head recessed inwardly to fit over said rim and plant holders pivoted in said head and having their outer ends normally in contact, and their inner ends projecting beyond the sides of said head, of an auxiliary frame erected upon the main frame, straddling said wheel and droppers, and cams upon the inner faces of the vertical bars of said auxiliary frame, with which the inner ends of the plant holders engage to open their outer ends as said wheel rotates.

In witness whereof we have hereunto set our hands this 25th day of November, 1891.

JOHN O. BENDER.
HUBERT H. BENDER.

In presence of—
H. P. DENISON,
C. B. KINNE.